US010560568B2

(12) United States Patent
Zhang

(10) Patent No.: US 10,560,568 B2
(45) Date of Patent: Feb. 11, 2020

(54) CONTROL METHOD, CONTROL DEVICE AND ELECTRONIC DEVICE

(71) Applicant: GUANGDONG OPPO MOBILE TELECOMMUNICATIONS CORP., LTD., Dongguan, Guangdong (CN)

(72) Inventor: Haiping Zhang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/429,017

(22) Filed: Jun. 2, 2019

(65) Prior Publication Data
US 2019/0379779 A1 Dec. 12, 2019

(30) Foreign Application Priority Data
Jun. 6, 2018 (CN) .......................... 2018 1 0573756

(51) Int. Cl.
H04M 1/725 (2006.01)
G06T 7/73 (2017.01)
G06T 7/246 (2017.01)

(52) U.S. Cl.
CPC ......... H04M 1/72569 (2013.01); G06T 7/246 (2017.01); G06T 7/73 (2017.01); H04M 2250/12 (2013.01)

(58) Field of Classification Search
CPC ..... H04W 48/16; H04W 4/021; H04W 4/029; H04W 72/005; H04W 12/12;
(Continued)

(56) References Cited

U.S. PATENT DOCUMENTS

2012/0050189 A1 3/2012 Choboter et al.
2012/0084691 A1 4/2012 Yun
(Continued)

FOREIGN PATENT DOCUMENTS

CN 103916935 7/2014
CN 106934269 7/2017
(Continued)

OTHER PUBLICATIONS

EPO, Office Action for EP Application No. 19178377.8, dated Aug. 2, 2019.
(Continued)

Primary Examiner — Diane D Mizrahi
(74) Attorney, Agent, or Firm — Hodgson Russ LLP

(57) ABSTRACT

The disclosure discloses a control method for an electronic device. The electronic device comprises a transparent display screen comprising a display area and an infrared sensor which is disposed below the display area. The control method comprises: acquiring continuous multi-frame environmental images when the electronic device is in a state of incoming call; processing the continuous multi-frame environmental images to collect a plurality of feature points in the environmental images; determining whether the plurality of feature points in the continuous multi-frame environmental images have changed; controlling the transparent display screen to be off when the plurality of feature points have changed; and controlling the infrared sensor to be on to detect a distance of an object to the electronic device. The disclosure also discloses a control device and electronic device.

20 Claims, 12 Drawing Sheets

(58) Field of Classification Search
CPC ....... H04W 24/00; H04M 3/567; H04M 3/42; H04M 7/1245; H04M 7/1255; G06T 2207/10016; G06T 2207/30196; G06T 7/11; G06T 7/194
See application file for complete search history.

(56) References Cited

U.S. PATENT DOCUMENTS

| | | |
|---|---|---|
| 2013/0095886 A1 | 4/2013 | Hong et al. |
| 2013/0308835 A1 | 11/2013 | Thorson |
| 2014/0354567 A1 | 12/2014 | Park et al. |
| 2015/0293282 A1 | 10/2015 | Takishita et al. |
| 2015/0338700 A1 | 11/2015 | Kimura et al. |
| 2016/0026253 A1* | 1/2016 | Bradski ................ G02B 27/225 345/8 |
| 2019/0094981 A1* | 3/2019 | Bradski ................ H04N 13/204 |

FOREIGN PATENT DOCUMENTS

| | | |
|---|---|---|
| CN | 107483712 | 12/2017 |
| CN | 107767835 | 3/2018 |
| CN | 107948419 | 4/2018 |
| CN | 108833694 | 11/2018 |
| JP | 2004159028 | 6/2004 |

OTHER PUBLICATIONS

WIPO, ISR for PCT/CN2019/090240, dated Aug. 27, 2019.
EPO, Office Action for EP Application No. 19178377.8, dated Nov. 15, 2019.

* cited by examiner

CONTROL METHOD, CONTROL DEVICE AND ELECTRONIC DEVICE

CROSS-REFERENCE TO RELATED APPLICATIONS

This application claims priority to Chinese Patent Application No. CN201810573756.3, filed Jun. 6, 2018, the entire disclosure of which is incorporated herein by reference.

TECHNICAL FIELD

The disclosure relates to the field of electronic technology, and more particularly, to a control method for an electronic device, control device, electronic device, computer storage medium and computer apparatus.

BACKGROUND

With development of the mobile phone, the full screen has become a development trend of the mobile phone. In order to increase the screen-to-body ratio of the mobile phone, it is necessary to dispose the infrared sensor below the display screen, which is originally disposed on the top of the screen of the mobile phone. However, infrared light emitted by the infrared sensor under the screen during operation is easy to cause electron migration of components within the display screen, thereby causing the display screen to partially flicker, and the user experience is relatively poor.

SUMMARY

In view of this, exemplary embodiments of the disclosure provide a control method for an electronic device, a control device, an electronic device, a computer storage medium and a computer apparatus.

The disclosure provides a control method for an electronic device, the electronic device comprising a transparent display screen comprising a display area and an infrared sensor which is disposed below the display area, and configured to emit infrared light and receive infrared light reflected by an object to detect a distance of the object to the electronic device, wherein the control method comprises:

acquiring continuous multi-frame environmental images when the electronic device is in a state of incoming call;

processing the continuous multi-frame environmental images to collect a plurality of feature points in the environmental images;

determining whether the plurality of feature points in the continuous multi-frame environmental images have changed;

controlling the transparent display screen to be off when the plurality of feature points have changed; and controlling the infrared sensor to be on to detect a distance of an object to the electronic device.

The disclosure provides a control device for an electronic device, the electronic device comprising a transparent display screen comprising a display area and an infrared sensor disposed below the display area, and configured to emit infrared light and receive infrared light reflected by an object to detect a distance of the object to the electronic device, wherein the control device comprises:

an acquisition module, configured to acquire continuous multi-frame environmental images when the electronic device is in a state of incoming call;

a processing module, configured to process in the continuous multi-frame environmental images to collect a plurality of feature points in the environmental images;

a determining module, configured to determine whether the plurality of feature points in the continuous multi-frame environmental images have changed; and a control module, configured to control the transparent display screen to be off when the plurality of feature points have changed;

wherein the control module is further configured to control the infrared sensor to be on to detect a distance of an object to the electronic device.

The disclosure provides an electronic device, comprising:

a transparent display screen comprising a display area;

an infrared sensor disposed below the display area, wherein the infrared sensor is configured to emit infrared light and receive infrared light reflected by an object to detect a distance of the object to the electronic device; and a camera module for capturing images; and a processor configured to acquire continuous multi-frame environmental images captured by the camera module, when the electronic device is in a state of incoming call;

process the continuous multi-frame environmental images to collect a plurality of feature points in the environmental images;

determine whether the plurality of feature points in the continuous multi-frame environmental images have changed;

control the transparent display screen to be off when the plurality of feature points have changed; and control the infrared sensor to be on to detect a distance of an object to the electronic device.

The disclosure provides one or more non-transitory computer readable storage medium containing computer executable instructions, wherein the computer executable instructions cause the processor to perform the above control method of the electronic device, when being executed by one or more processors.

The disclosure provides a computer apparatus comprises a memory and a processor, wherein the memory stores computer readable instructions, wherein the computer readable instructions causes the processor to perform the above control method of the electronic device, when being executed by the processor.

The control method, the control device, the electronic device, the computer readable storage medium and the computer apparatus of the embodiments of the disclosure capture the multi-frame environmental images through the camera module when the electronic device is in the state of incoming call. When that the plurality of feature points in the multi-frame environmental images have changed is detected, it indicates that the user approaches the electronic device and makes a call. Then, turn off the transparent display screen and turn on the infrared sensor, which can avoid the influence of the flicker of the infrared sensor on the transparent display screen.

Additional aspects and advantages of the disclosure will be set forth in part in the following description, wherein part will become evident in the following description, or from practice of the disclosure.

BRIEF DESCRIPTION OF THE DRAWINGS

The above and/or additional aspects and advantages of the disclosure will become evident and easy to be understood with reference to following drawings.

DETAILED DESCRIPTION

Figure 1:
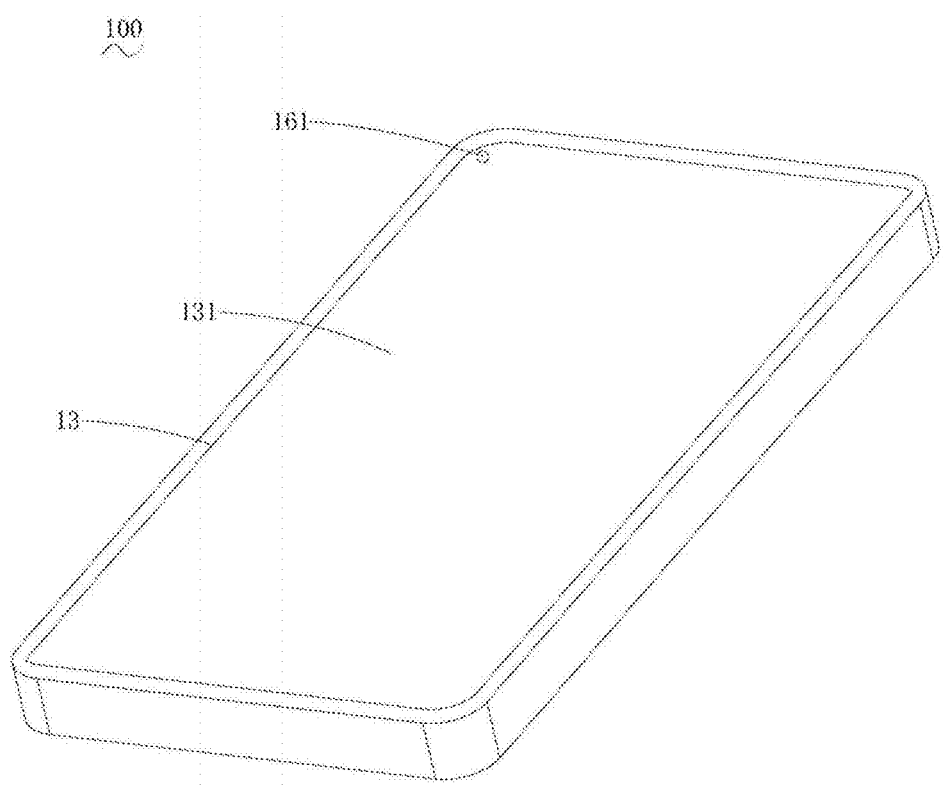
FIG. 1 is a perspective view of an electronic device, according to an embodiment of the disclosure.
Figure 2:
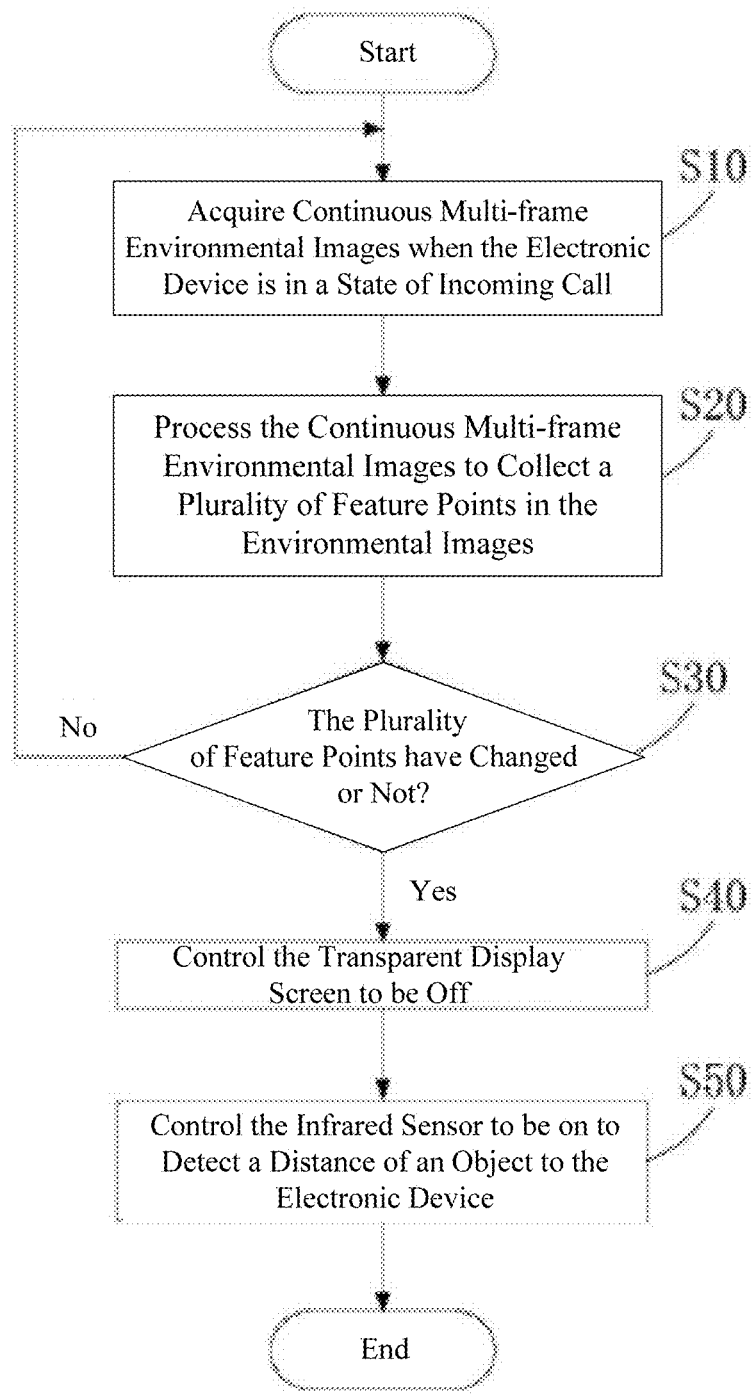
FIG. 2 is a flow chart of a control method, according to an embodiment of the disclosure.

Embodiments of the disclosure are described in detail below, examples of which are illustrated in the drawings, wherein the same or similar reference numerals indicate the same or similar components or the components having the same or similar functions throughout. The embodiments described below with reference to the drawings are exemplary and are only intended for illustrating the disclosure, which should not to be construed as restriction of the disclosure.

A control method, a control device 200, an electronic device 100, a computer readable storage medium and a computer apparatus 300 of the embodiments of the disclosure are described in detail below with reference to FIG. 1 to FIG. 16.

Referring to FIG. 1 to FIG. 5, an embodiment of the disclosure provides a control method for the electronic device 100. The electronic device 100 comprises a transparent display screen 13 and an infrared sensor 161. The transparent display screen 13 comprises a display area 131. The infrared sensor 161 is disposed below the display area 131, and the infrared sensor 161 is configured to emit infrared light and receive infrared light reflected by an object to detect a distance of the object to the electronic device 100. The control method comprises steps:

S10: acquiring continuous multi-frame environmental images when the electronic device is in a state of incoming call;

S20: processing the continuous multi-frame environmental images to collect a plurality of feature points in the environmental images;

S30: determining whether the plurality of feature points in the continuous multi-frame environmental images have changed;

S40: controlling the transparent display screen to be off when the plurality of feature points have changed; and S50: controlling the infrared sensor to be on to detect a distance of an object to the electronic device.

An embodiment of the disclosure provides a control device 200 for the electronic device 100. The control method for the electronic device 100 of the embodiments of the disclosure may be implemented by the control device 200 of the embodiments of the disclosure. The control device 200 comprises an acquisition module 21, a processing module 22, a determining module 23, and a control module 24. The step S10 may be implemented by the acquisition module 21. The step S20 may be implemented by the processing module 22. The step S30 may be implemented by the determining module 23. The step S40 and the step S50 may be implemented by the control module 24. That is to say, an acquisition module 21 is configured to acquire continuous multi-frame environmental images when the electronic device 100 is in a state of incoming call. The processing module 22 is configured to process in the continuous multi-frame environmental images to collect a plurality of feature points in the environmental images. The determining module 23 is further configured to determine whether the plurality of feature points in the continuous multi-frame environmental images have changed. The control module 24 is configured to, when the plurality of feature points have changed, control the transparent display screen 13 to be off and control the infrared sensor 161 to be on to detect a distance of an object to the electronic device 100.

An embodiment of the disclosure provides an electronic device 100. The electronic device 100 comprises a transparent display screen 13, an infrared sensor 161, a camera module 162 and a processor 10. The transparent display screen 13 comprises a display area 131. The infrared sensor 161 is disposed below the display area 131, and the infrared sensor 161 is configured to emit infrared light and receive infrared light reflected by an object to detect a distance of the object to the electronic device 100. The camera module 162 is configured to capture images. The step S10, the step S20, the step S30, the step S40, and the step S50 may be implemented by the processor 10. That is to say, the processor 10 may be configured to, when the electronic device 100 is in a state of incoming call, collect continuous multi-frame environmental images captured by the camera module 162; process the continuous multi-frame environmental images to collect a plurality of feature points in the environmental images; determine whether the plurality of feature points in the continuous multi-frame environmental images have changed; when the plurality of feature points have changed, control the transparent display screen 13 to be off; and control the infrared sensor 161 to be on to detect a distance of an object to the electronic device 100.

An embodiment of the disclosure provides a computer apparatus 300. In the exemplary embodiments of the disclosure, the control device 200 may also be utilized in the computer apparatus 300. The computer apparatus 300 may be a mobile phone, a tablet computer, a notebook computer, a smart wristband, a smart watch, a smart helmet, a pair of smart eyeglass, a game machine, or the like. The electronic device 100 of the embodiments of the disclosure may also be one kind of the computer devices 300.

An exemplary embodiment of the disclosure is illustrated by taking the electronic device 100 as a mobile phone as an example. An infrared sensor is generally disposed on the top of a mobile phone screen to determine a distance between the mobile phone and an obstacle and makes corresponding adjustments, thereby preventing a user from misoperation and saving power of the mobile phone. When the user answers or makes a call, the infrared sensor 161 initiates the operation of distance detection. When the user brings the mobile phone close to the head, the infrared sensor 161 generates detection information by calculating the time of the transmitter emitting infrared light and the receiver receiving the reflected infrared light, or generates detection information based on the intensity of the transmitter emitting infrared light and the receiver receiving the reflected infrared light. The processor sends a corresponding instruction to the controller based on the detection information, and the controller controls the screen to be off based on the instruction. When the mobile phone is far away from the head, the processor sends a corresponding instruction to the controller again based on the detection information fed back by the infrared sensor 161, and the controller controls the screen to be on again based on the instruction.

With development of the mobile phone, the full screen has become the latest development trend. In order to increase the screen-to-body ratio of the mobile phone, the infrared sensor is disposed below the area of the display screen. However, in the process of the user answering or making a call, when the infrared sensor located below the area of the display screen is turned on and emits infrared light for distance detection, the infrared light emitted by the infrared sensor will irradiate on TFT (Thin Film Transistor) substrate of the display screen. Due to the photoelectric effect, with irradiation of the infrared light, electrons inside the TFT substrate are excited by infrared photons to generate a current, and the infrared sensor emits a pulse of infrared light, which causes the display screen to flicker.

In the control method of the embodiments of the disclosure, the electronic device 100, first when being in a state of incoming call, collects continuous multi-frame environmental images; then process the continuous multi-frame environmental images to collect a plurality of feature points in the environmental images; and then determines whether the plurality of feature points in the continuous multi-frame environmental images have changed; controls the transparent display screen 13 to be off when the plurality of feature points have changed; and control the infrared sensor 161 to be on to detect a distance of an object to the electronic device 100. In this way, after turning off the transparent display screen 13 and then turning on the infrared sensor 161, influence of the flicker of the infrared sensor 161 on the transparent display screen 13 can be avoided.

Figure 6:
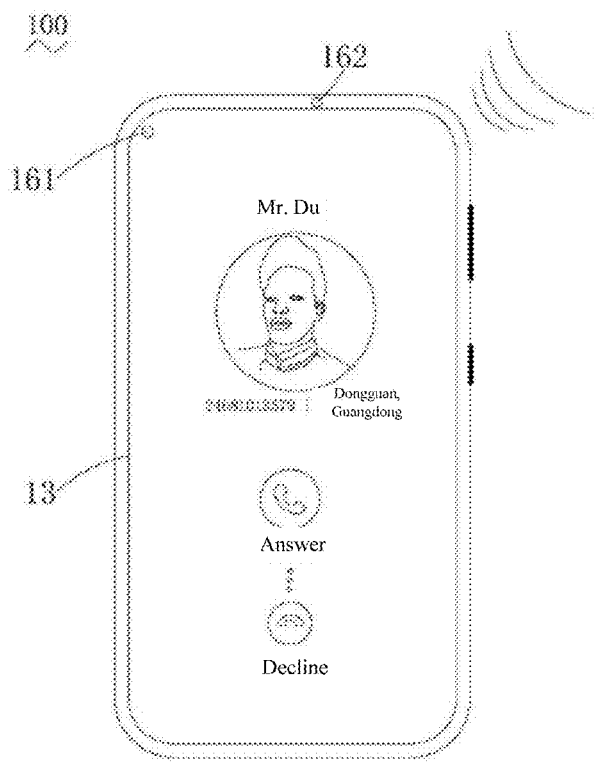
FIG. 6 is a schematic diagram of a scenario of an embodiment of the disclosure.
Figure 7:
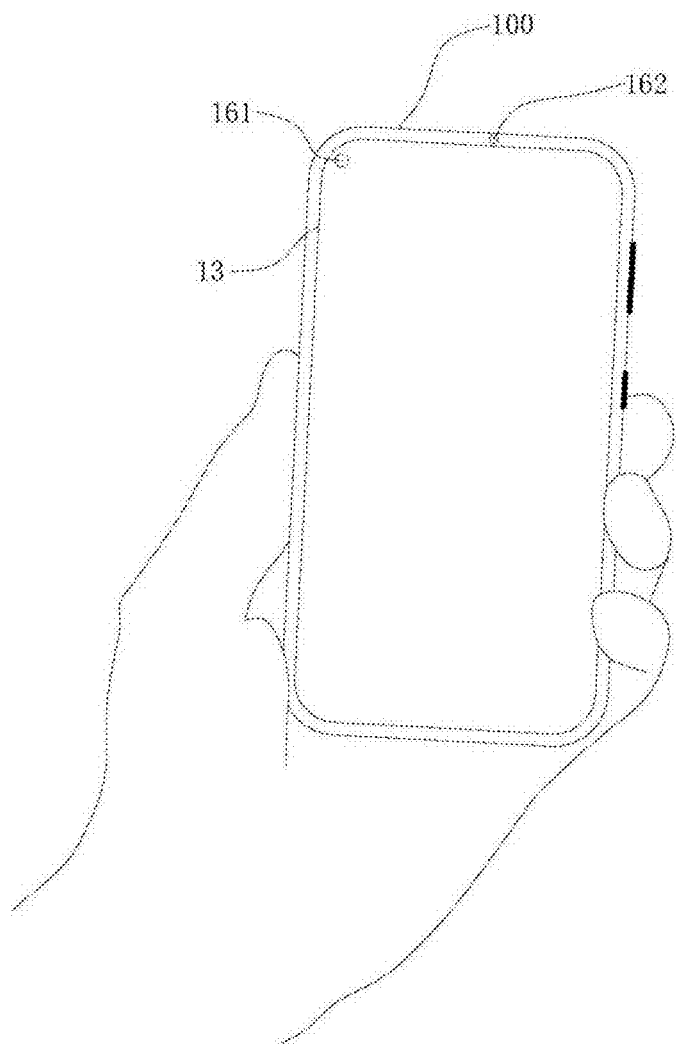
FIG. 7 is another schematic diagram of a scenario of an embodiment of the disclosure.

Referring to FIG. 6, the electronic device 100 is in a state of incoming call. The electronic device 100 acquires continuous multi-frame environmental images through the camera module 162, and then processes the continuous multi-frame environmental images to collect a plurality of feature points in the environmental images, wherein the plurality of feature points may be features of a human face such as facial contour features and eye contour features, and may also be features of background environmental objects, which are not restricted herein. Then determine whether the plurality of feature points in the continuous multi-frame environmental images have changed or whether the changes of the plurality of feature points exceed a predetermined value of changes. When the plurality of feature points have changed or the changes of the plurality of feature points exceed the predetermined value of changes, it indicates that the user brings the electronic device 100 close to the head to prepare a call. Referring to FIG. 7, at this time, control the transparent display screen 13 to be off, and control the infrared sensor 161 to be on to detect a distance of an object to the electronic device 100. In this way, after turning off the transparent display screen 13, turn on the infrared sensor 161, which can avoid the influence of the flicker of the infrared sensor 161 on the transparent display screen 13.

The control method of the embodiments of the disclosure is also applied to a scenario of the electronic device 100 being in a state of outgoing call. Specifically, it may be determined whether the electronic device 100 is in a state of outgoing call by detecting itself. When the electronic device 100 is calling out, captures multi-frame environmental images by the camera module 162. When that a plurality of feature points in the multi-frame environmental images have changed or the changes of the plurality of feature points exceed a predetermined value of changes is detected, which indicates the user brings the electronic device 100 close to the head to prepare a call. Then, turn off the transparent display screen 13 and turn on the infrared sensor 161, which can avoid the influence of the flicker of the infrared sensor 161 on the transparent display screen 13.

It can be understood that the scenario of incoming call and the scenario of outgoing call are merely exemplary, which the embodiments of the disclosure are not restricted thereto. For example, there may also be other scenarios of other voice call applications (WeChat, QQ, Mi Chat, Yixin, etc.), which is not restricted herein.

It should also be noted that when the electronic device is not in the state of incoming call, the electronic device 100 maintains its original state and re-determines whether the transparent display screen 13 is on. After the electronic device is in the state of incoming call, when the plurality of feature points in the multi-frame environmental images have not changed or the changes of the plurality of feature points do not exceed the predetermined value of changes, the electronic device 100 maintains its original state, recaptures continuous multi-frame environmental images by using the camera module 162 and determines whether the plurality of feature points in the multi-frame environmental images have changed or the changes of the plurality of feature points exceed the predetermined value of changes.

Figure 3:
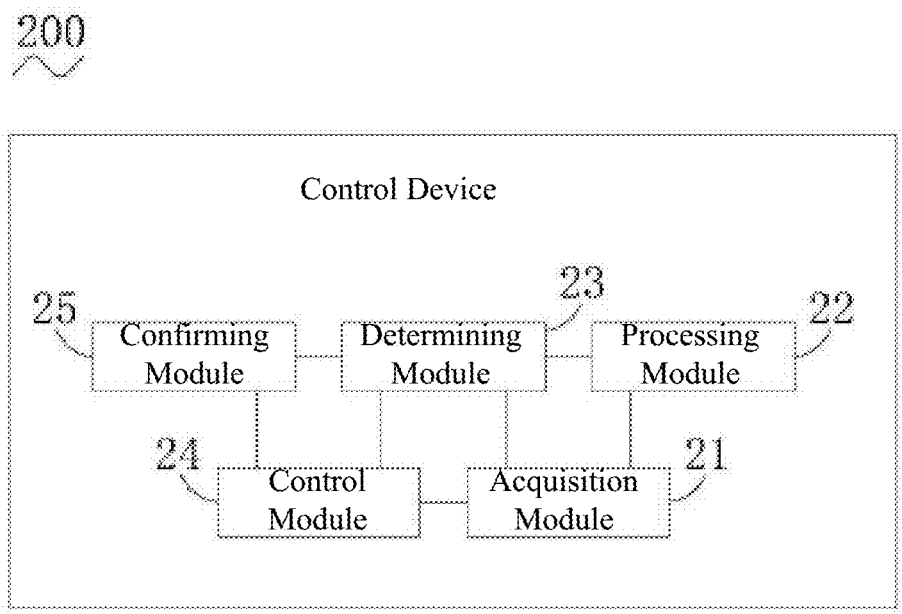
FIG. 3 is a block diagram of a control device, according to an embodiment of the disclosure.
Figure 4:
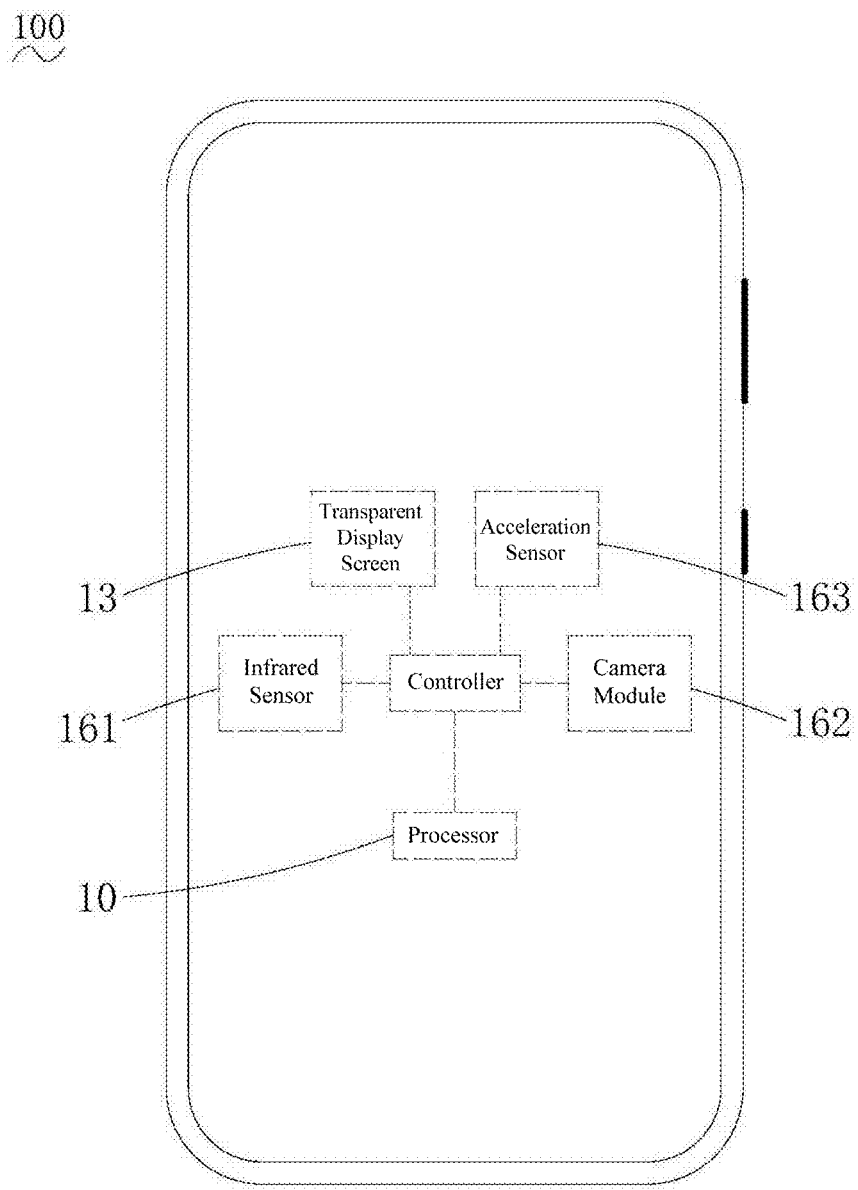
FIG. 4 is a block diagram of an electronic device, according to an embodiment of the disclosure.
Figure 8:
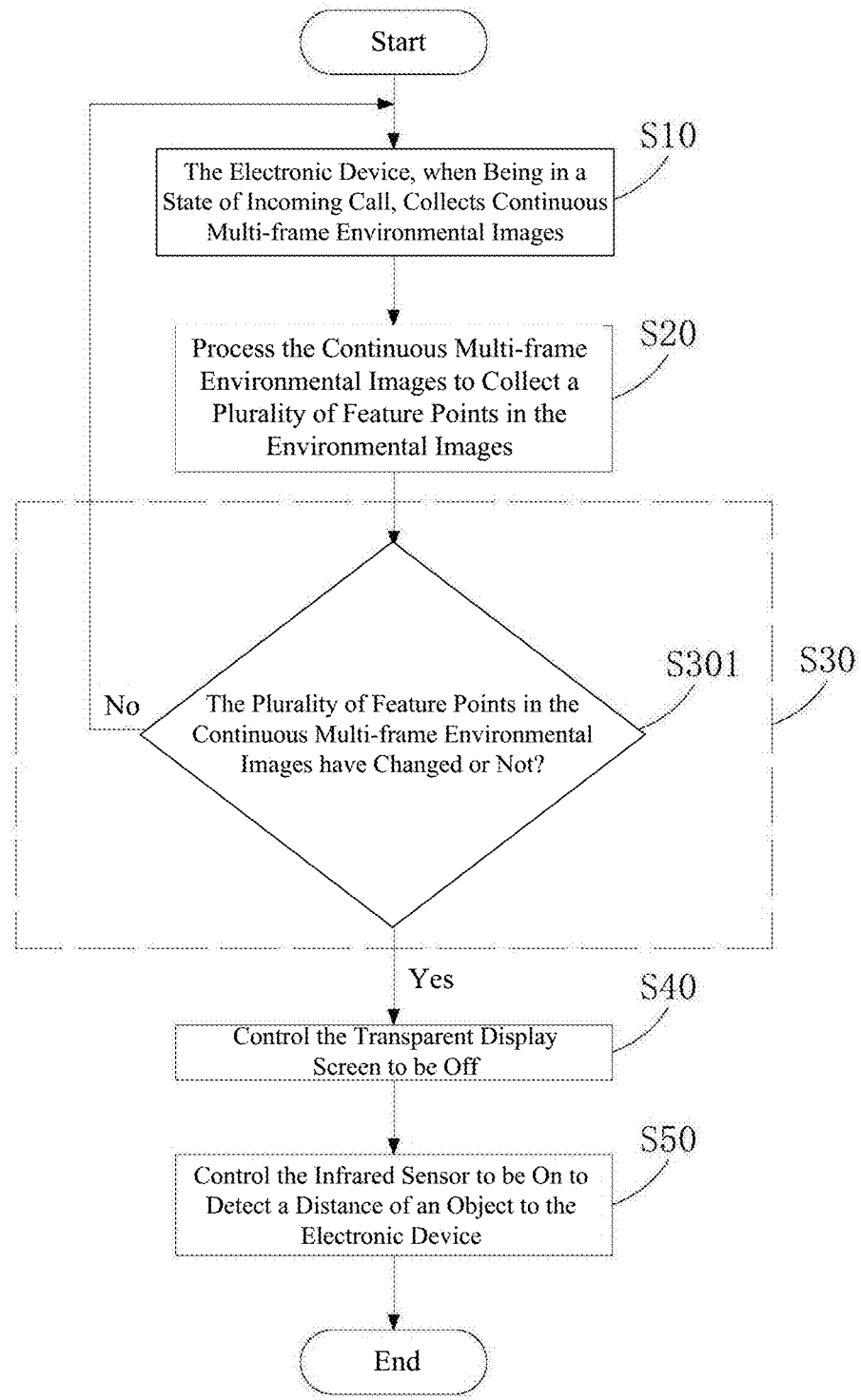
FIG. 8 is another flow chart of a control method, according to an embodiment of the disclosure.

Referring to FIG. 3, FIG. 4 and FIG. 8, further, in such embodiments, the step S30 of determining whether the plurality of feature points in the continuous multi-frame environmental images have changed comprises:

S301: determining whether the positions of the plurality of feature points in a current frame environmental image have changed, compared with the plurality of feature points in a previous frame environmental image.

Further, in such embodiments, the step S301 may be implemented by the determining module 23. That is to say, the determining module 23 is configured to determine whether the positions of the plurality of feature points in the current frame environmental image have changed, compared with the plurality of feature points in the previous frame environmental image.

Further, in such an embodiment, the processor 10 of the electronic device 100 may implement the step S301. That is to say, the processor 10 is configured to determine whether the positions of the plurality of feature points in a current frame environmental image have changed, compared with the plurality of feature points in the previous frame environmental image.

Figure 9:
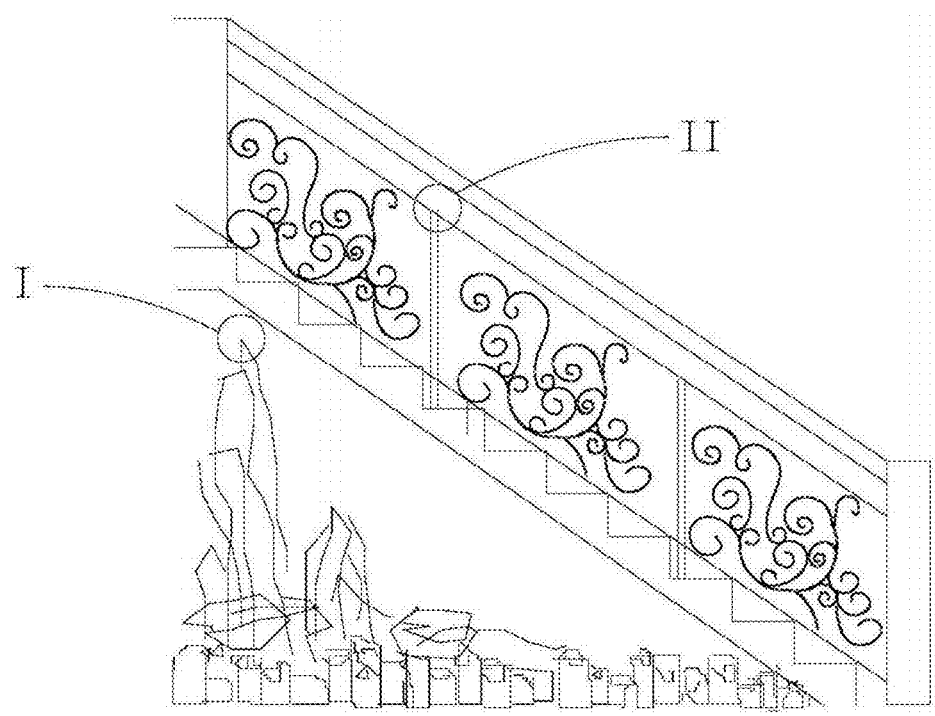
FIG. 9 is another schematic diagram of a scenario of an embodiment of the disclosure.
Figure 10:
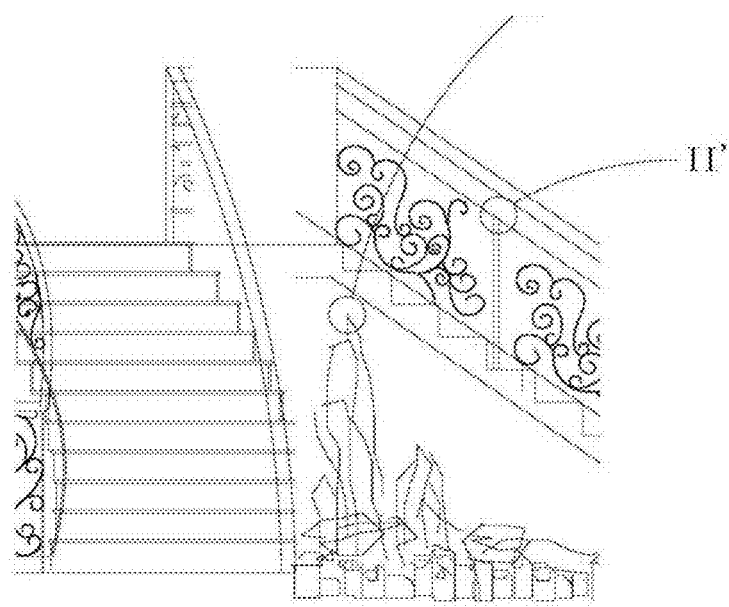
FIG. 10 is another schematic diagram of a scenario of an embodiment of the disclosure.

Specifically, referring to FIG. 9, the positions of the feature point I and the feature point II in the current environmental image in the image may be collected and recorded, referring to FIG. 10, then are compared with the positions of the feature point I' and the feature point II' in the previous environmental image in the image. At this time, both of the positions of the feature point I and the feature point II in the current frame environmental image, relative to the positions of the feature point I' and the feature point II' in the previous frame environment image, have changed. It can be understood that the plurality of feature points in the image may be collected, which is not restricted herein.

It should be noted that when the positions of the plurality of feature points in the current frame environmental image, compared with the plurality of feature points in the previous frame environmental image, have not changed, the electronic device 100 maintains its original state, recaptures the continuous multi-frame environmental images by using the camera module 162 and determine whether the positions of the plurality of feature points have changed.

Figure 11:
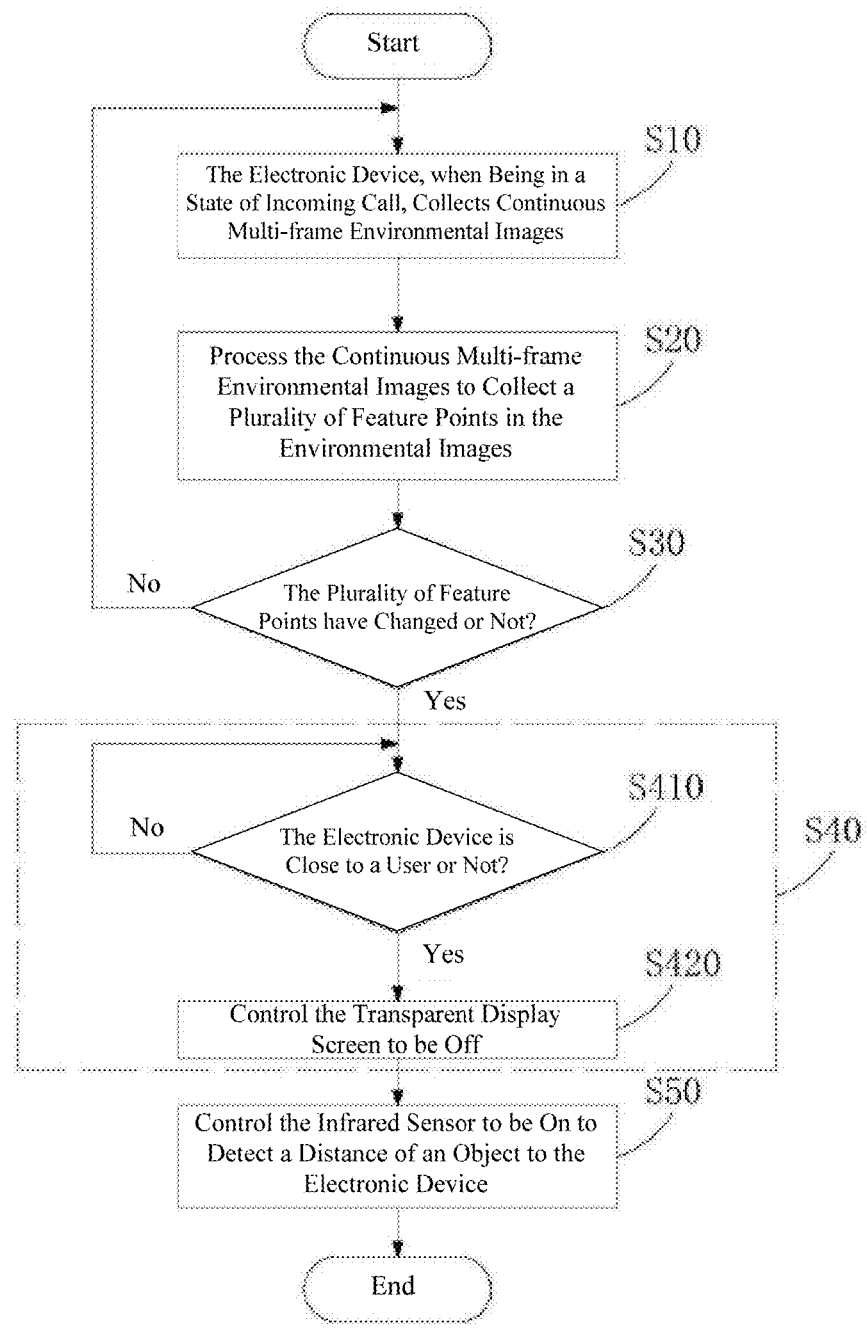
FIG. 11 is another flow chart of a control method, according to an embodiment of the disclosure.

Referring to FIG. 3, FIG. 4 and FIG. 11, further, in such embodiments, the step S40 of controlling the transparent display screen to be off comprises:

S410: determining whether the electronic device is close to a user; and

S420: controlling the transparent display screen to be off when the electronic device is close to the user.

Further, in such embodiments, the step S410 may be implemented by the determining module 23 and the step S420 may be implemented by the controlling module 24. That is to say, the determining module 23 is configured to determine whether the electronic device 100 is close to a user. The controlling module 24 is configured to control the transparent display screen 13 to be off when the electronic device 100 is close to the user.

Further, in such embodiments, the processor 10 of the electronic device 100 may implement the step S410 and the step S420. That is to say, wherein the processor 10 is configured to determine whether the electronic device 100 is close to a user, and control the transparent display screen 13 to be off when the electronic device 100 is close to the user.

Specifically, in a case that the plurality of feature points in the continuous multi-frame environmental images have changed, when detecting that the electronic device 100 is close to a user, it indicates that the user does not need to view the content of the transparent display screen 13 but is ready to make a call waiting for being answered by the other party, or the other party has answered the call and the user approaches the electronic device 100 to make the call. Therefore, when the electronic device 100 is close to the user, the infrared sensor 161 may be turned on after turning off the transparent display screen 13. In this way, it is possible to avoid the influence of the flicker of the infrared sensor 161 on the transparent display screen 13.

It can be understood that if it is detected that the electronic device 100 is in the state of incoming call and away from the user, the user may need to perform other operations. At this time, the brightness of the transparent display screen 13 may be restored for the user to perform the next operation. If it is detected that the electronic device 100 is in a state of incoming call and is close to the user again, the transparent display screen 13 will be off again.

In addition, when it is determined that the electronic device 100 is not close to the user, the electronic device 100 maintains its original state and re-determines whether the electronic device 100 is close to the user.

It should be noted that the manner of determining whether the electronic device 100 is close to the user in the step S410 can be detected by the following embodiments.

Figure 12:
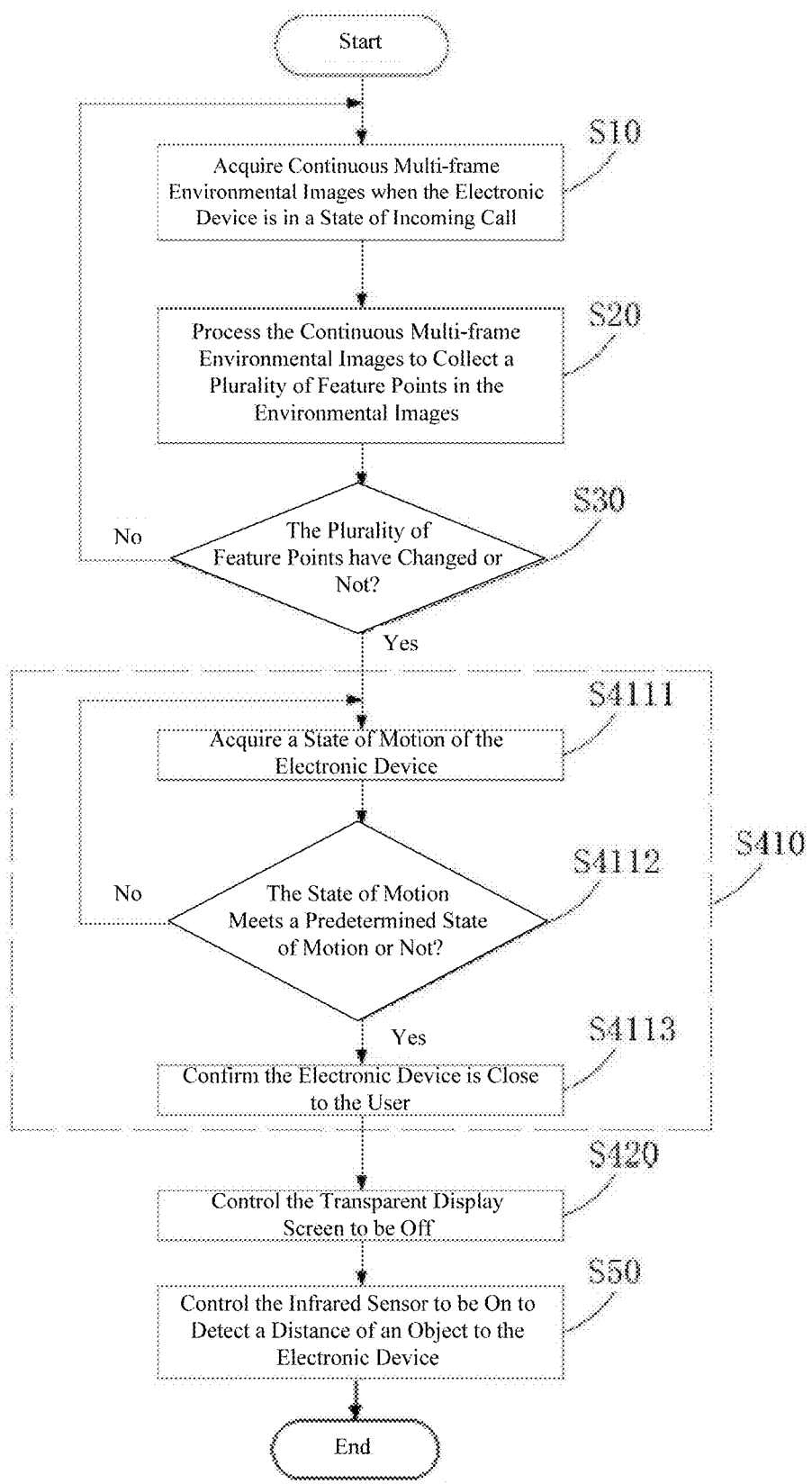
FIG. 12 is further another flow chart of a control method, according to an embodiment of the disclosure.

Referring to FIG. 3, FIG. 4 and FIG. 12, further, in such embodiments, the step S410 of determining whether the electronic device is close to the user comprises:

S4111: acquiring a state of motion of the electronic device;

S4112: determining whether the state of motion meets a predetermined state of motion; and S4113: confirming that the electronic device is close to the user, when the state of motion meets the predetermined state of motion.

Further, in such embodiments, the control device 200 comprises a confirming module 25. The step S4111 may be implemented by the acquisition module 21. The step S4112 may be implemented by the determining module 23. The step S4113 may be implemented by the confirming module 25. That is to say, the acquisition module 21 is configured to acquire a state of motion of the electronic device 100. The determining module 23 is configured to determine whether the state of motion meets the predetermined state of motion. The confirming module 25 is configured to confirm the electronic device 100 is close to the user, when the state of motion meets the predetermined state of motion.

Further, in such embodiments, the electronic device 100 comprises an acceleration sensor 163 for detecting the state of motion of the electronic device 100. The processor 10 is configured to acquire the state of motion of the electronic device 100 which is detected by the acceleration sensor 163, determine whether the state of motion meets the predetermined state of motion, and confirm that the electronic device 100 is close to the user when the state of motion meets the predetermined state of motion.

Specifically, it may be determined whether the electronic device 100 is close to the user by detecting whether the electronic device 100 is lifted by the user. When that the electronic device 100 is lifted is detected, it may be confirmed that the electronic device 100 is close to the user. Detecting the motion of lifting of the user may be implemented by components such as a gyroscope and the acceleration sensor 163 of the electronic device 100. In general, the gyroscope can measure the rotational angular velocity of the electronic device 100 when it is deflected and tilted. The acceleration sensor 163 can capture several typical modes of motion of the electronic device 100 such as shaking and tilting. The gyroscope and the acceleration sensor 163 may detect the state of motion of the electronic device 100, such as picking up, shaking and swinging. As described above, it may determine whether the user has an motion of lifting the electronic device 100 based on the detection data of the gyroscope or the acceleration sensor 163.

It can be understood that, when the state of motion of the electronic device 100 does not meet the predetermined state of motion, the electronic device 100 maintains its original state, reacquires the state of motion of the electronic device 100 and re-determines whether the state of motion of the electronic device 100 meets the predetermined state of motion.

It should be noted that the specific motion data of the predetermined state of motion is set based on actual conditions, which is not restricted herein.

In addition, the manner of determining whether the electronic device 100 is close to the user in the step S410 may also be detected by the following embodiments.

Figure 13:
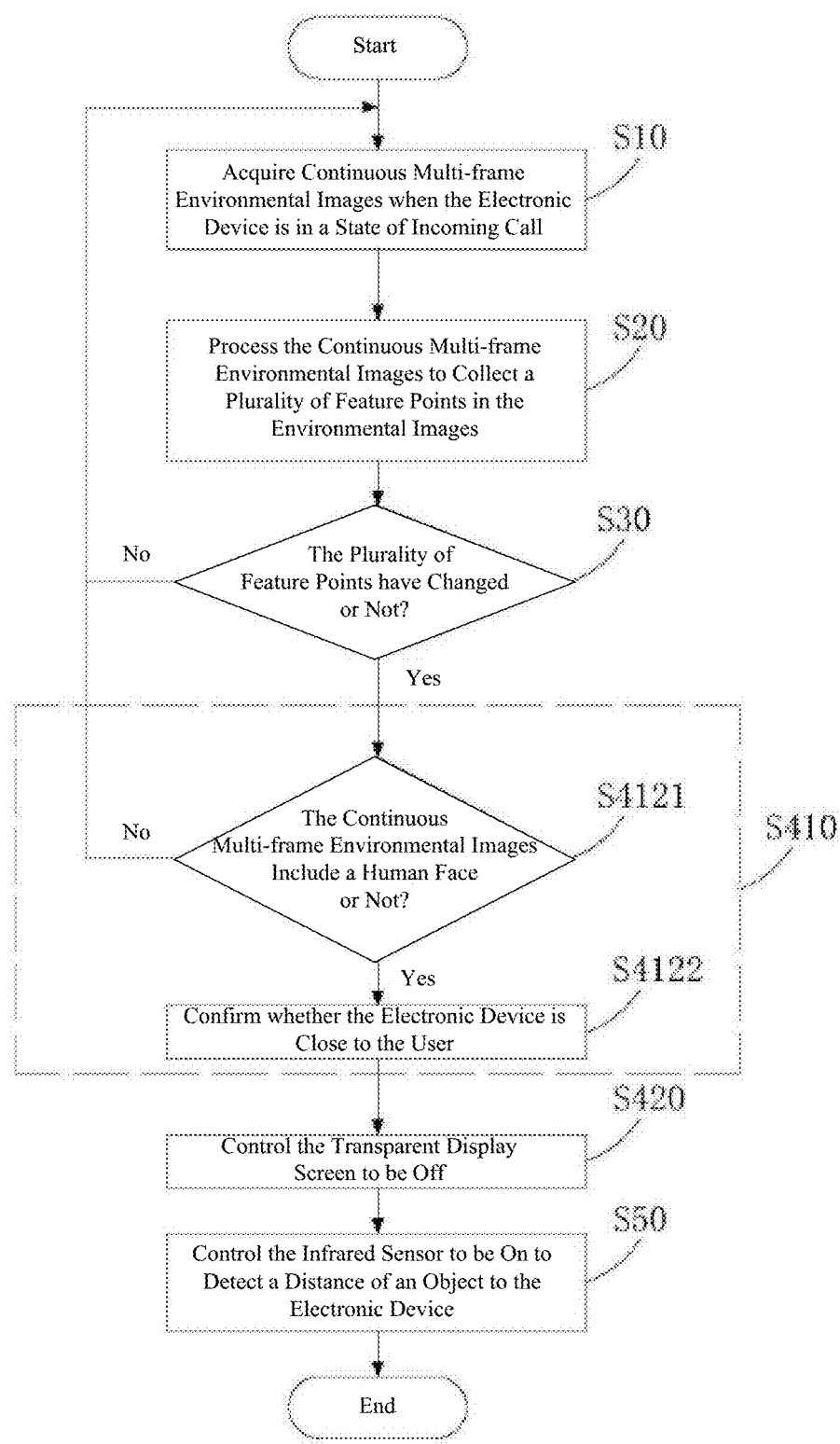
FIG. 13 is another flow chart of a control method, according to an embodiment of the disclosure.
Figure 14:
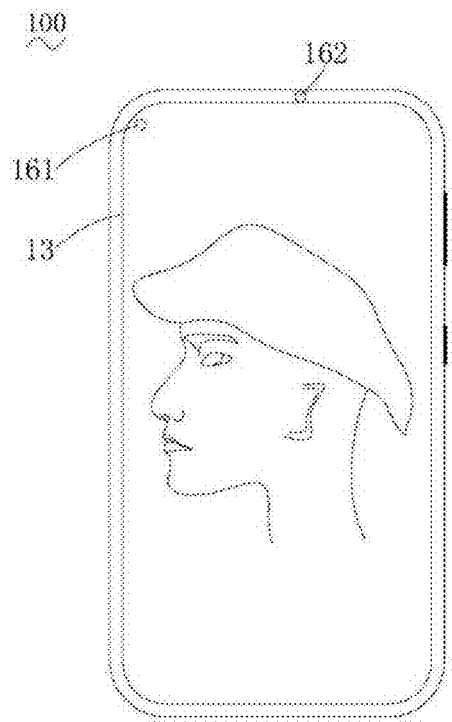
FIG. 14 is another schematic diagram of a scenario of an embodiment of the disclosure.

Referring to FIG. 3, FIG. 4 and FIG. 13, further, in such embodiments, the step S410 of determining whether the electronic device is close to the user comprises:

S4121: determining whether the continuous multi-frame environmental images includes a human face; and S4122: confirming the electronic device is close to the user, when the continuous multi-frame environmental images include the human face.

Further, in such embodiments, the step S4121 may be implemented by the determining module 23, the step S4122 may be implemented by the confirming module 25. The determining module 23 is configured to determine whether the continuous multi-frame environmental images include a human face. The confirming module 25 is configured to confirm the electronic device 100 is close to the user, when the continuous multi-frame environmental images include the human face.

Further, in such embodiments, the processor 10 is configured to determine whether the continuous multi-frame environmental images include eyes of human, and determine that the electronic device 100 is close to the user when the eyes of human is included in the continuous multi-frame environment images.

Specifically, after identifying the plurality of feature points in the continuous multi-frame environmental images have changed, it may continue to identify whether the continuous multi-frame environmental images include a human face. For example, whether the electronic device 100 is close to a user may be determined by identifying whether there is a region of human face in the continuous multi-frame environmental images and further identifying whether the region of human face includes a region of human ear. Specifically, referring to FIG. 14, when it is identified that there is a region of side face of a user in the continuous multi-frame environmental images and there is a region of human ear in the region of side face, it may be determined that the user is already close to the electronic device 100.

It can be understood that if it is detected that there is no region of human face in the continuous multi-frame environmental images, or a region of human face does not include a region of human ear, it may be determined that the electronic device 100 is not close to the user.

The detection of human face may be performed based on the preset portrait template, color, and the like in the database. When there is a human face in the identifying scenario, the part connected to the human face may be determined as the portrait area. The specific embodiment is not restricted herein. For example, it may also determine a human face by matching with a portrait template. It can be understood that the identification of the region of human face may also be to identify whether there is a continuous color patch, and then identify the contour to determine a human face and a region of human ear.

The camera module 162 may be a front-facing camera of the electronic device 100. The camera module 162 may acquire an RGB image of the environment in which the electronic device 100 is. The camera module 162 may also be a depth camera. In a depth image, depth data corresponding to features of nose, eyes, and ears in the region of human face are different. For example, when the human face is facing sideways the electronic device 100, in the captured depth image, the depth data corresponding to the nose may be large, while the depth data corresponding to the ears may be small. The number of the camera module 162 may be multiple, such as two front-facing cameras.

Figure 15:
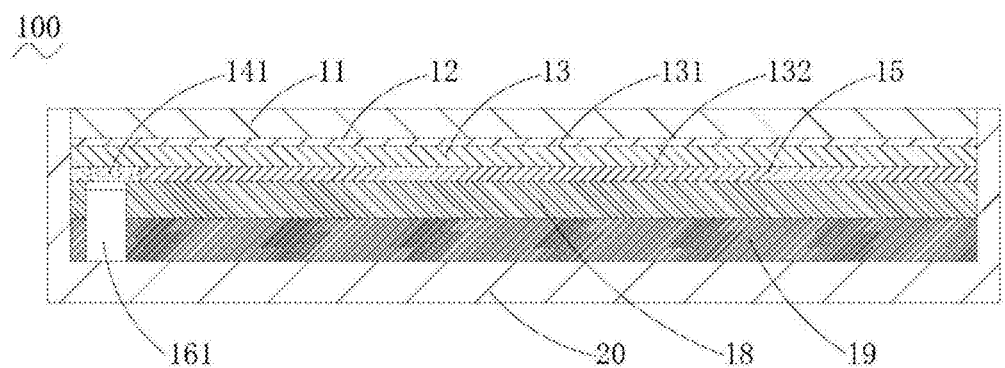
FIG. 15 is a schematic cross-sectional view of an electronic device, according to an embodiment of the disclosure.

Referring to FIG. 15, further, in such an embodiment, the electronic device 100 further comprises a housing 20, wherein the housing 20 is configured to house components and subassemblies for protection, thereby avoiding external factors damaging these components directly. The housing 20 may be formed by machining an aluminum alloy by a CNC machine tool, or may be injection molded from a polycarbonate (PC) or a PC+ABS material.

Further, in such an embodiment, the transparent display screen 13 comprises an OLED display screen.

Specifically, the OLED display screen has good light transmittance, which is capable of transmitting visible light and infrared light well. Therefore, the OLED display screen will not affect the infrared sensor 161 to emit and receive infrared light at all in the case of exhibiting the effect of the content. The transparent display screen 13 may also be a Micro LED display screen, wherein the Micro LED display screen also has good light transmittance for visible light and infrared light. Of course, these display screens are merely exemplary and the exemplary embodiments of the disclosure are not restricted herein.

Further, in such an embodiment, the electronic device 100 may comprise a transparent cover 11 and a transparent touch panel 12. The transparent cover 11 is formed on the transparent touch panel 12. The transparent touch panel 12 is disposed on the transparent display screen 13. The upper surface 131 of the transparent display screen 13 faces the transparent touch panel 12. Both the transparent cover 11 and the transparent touch panel 12 have a visible light transmittance and an infrared light transmittance of more than 90%.

Specifically, the transparent touch panel 12 is mainly configured to receive an input signal generated by a user touching the transparent touch panel 12 and transmit the input signal to a circuit board for data processing, thereby obtaining a specific position of the user's touch of the transparent touch panel 12. The In-Cell or On-Cell lamination technology may be used to laminate the transparent touch panel 12 and the transparent display panel 13, thereby effectively reducing weight of the display screen and overall thickness of the display screen. In addition, the transparent cover 11 is disposed on the transparent touch panel 12, which can effectively protect the transparent touch panel 12 and its internal structure and avoid external force damaging the transparent touch panel 12 and the transparent display screen 13. The transmittances of both the transparent cover 11 and the transparent touch panel 12 for visible light and infrared light are more than 90%, which not only facilitates the transparent display screen 13 to display effect of content well, but also facilitates the infrared sensor 161 disposed below the transparent display screen 13 to stably emit and receive infrared light, which ensures the normal operation of the infrared sensor 161.

Further, in such an embodiment, the electronic device 100 comprises a first coating layer 141 coated on the lower surface 132 and covering the infrared sensor 161. The first coating layer 141 is used to transmit infrared light and intercept visible light. The infrared sensor 161 is for transmitting and/or receiving infrared light transmitting though the first coating layer 141 and the transparent display screen 13.

Specifically, the first coating layer 141 is configured to transmit infrared light to ensure the normal operation of the infrared sensor 161. The first coating layer 141 intercepts visible light, so that the infrared sensor 161 cannot be seen when the electronic device 100 is viewed from outside.

Further, in such an embodiment, the orthographic projection of the infrared sensor 161 on the lower surface 132 is located within the orthographic projection of the first coating layer 141 on the lower surface 132.

Specifically, in the process of performing assembly process, the installation of the infrared sensor 161 usually requires a reserved assembly gap, resulting in a gap between the infrared sensor 161 and other components, which allows visible light enters from the gap and occur light-leaking phenomenon. Therefore, in the direction in which the infrared sensor 161 and the transparent display screen 13 are stacked, the area of the orthographic projection of the first coating layer 141 on the lower surface 132 is larger than the area of the orthographic projection of the infrared sensor 161 on the lower surface 132. The first coating layer 141 can be sufficiently shielded the infrared sensor 161 without influence on normal operation of the infrared sensor 161 and the infrared sensor 161 can have an effect of invisibility when the electronic device 100 is viewed from outside.

Figure 16:
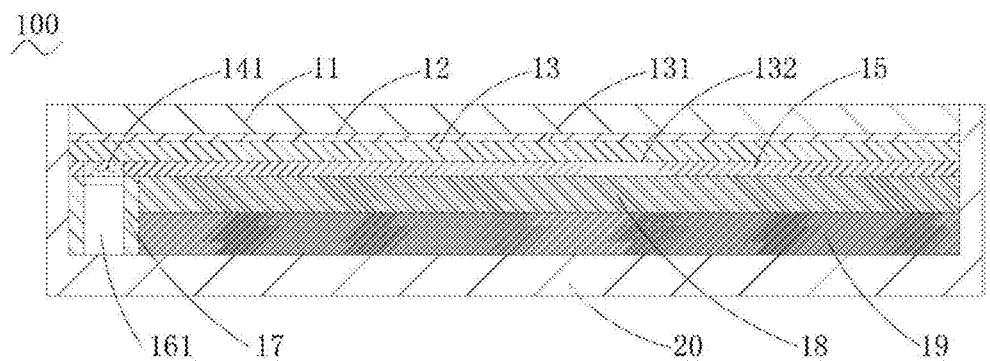
FIG. 16 is another schematic cross-sectional view of an electronic device, according to an embodiment of the disclosure.

Referring to FIG. 16, further, in such an embodiment, the orthographic projection of the infrared sensor 161 on the lower surface 132 coincides with the first coating layer 141.

Specifically, in a direction in which the infrared sensor 161 and the transparent display screen 13 are stacked, an area of orthographic projection which the first coating layer 141 is projected onto the lower surface 132 may be equal to an area of orthographic projection which the infrared sensor 161 is projected on the lower surface 132. In this way, the first coating layer 141 can just block the infrared sensor 161 without influence on the normal operation of the infrared sensor 161, and the infrared sensor 161 can have an effect of invisibility when the electronic device being viewed from the direction toward and perpendicular to the upper surface 131 of the transparent display screen 13.

Further, in such an embodiment, the electronic device further comprises a light shading layer 17 disposed on the lower surface 132 and surrounds the infrared sensor 161.

Specifically, in the case when the area of orthographic projection which the first coating layer 141 is projected onto the lower surface 132 is equal to the area of orthographic projection which the infrared sensor 161 is projected onto the lower surface 132, volume of space for placing the infrared sensor 161 is larger than volume of the infrared sensor 161, which leads to, when the electronic device 100 is viewed from external environment, the light-leaking phenomenon occurs around the space around the infrared sensor 161. Therefore, by setting the light shading layer 17 surrounding the infrared sensor 161, the gap between the infrared sensor 161 and the surrounding space is filled, which may avoid this light-leaking phenomenon. The light shading layer 17 may be a foam made of a black material, or may be other black foamed plastic or rubber. Of course, these materials are merely exemplary and exemplary embodiments of the disclosure are not restricted herein.

Further, in such an embodiment, the first coating layer 141 comprises an IR ink, wherein the IR ink has a light transmittance of more than 85% for infrared light, wherein the IR ink has a light transmittance of less than 6% for visible light, wherein the IR ink allows infrared light which has a wavelength of more than 850 nm to transmit.

Specifically, since the IR ink has a characteristic of low light transmittance for visible light, when the electronic device 100 is viewed from outside, the infrared sensor 161 disposed under the first coating layer 141 cannot be visually observed by the vision of human eyes. At the same time, the IR ink also has a characteristic of high transmittance for infrared light, and enables the infrared sensor 161 to stably emit and receive infrared light, thereby ensuring normal operation of the infrared sensor 161.

Referring to FIG. 15 and FIG. 16, further, in such an embodiment, the electronic device 100 also comprises a second coating layer 15 coated on the lower surface 132 and connected with the first coating layer 141.

Specifically, the first coating layer 141 is mainly configured to transmit infrared light and shield the infrared sensor 161. However, since the cost of the IR ink used by the first coating layer 141 is higher than that of ordinary black ink, if the lower surface 132 is entirely coated with the IR ink will not be conducive to reducing the cost of production. Also, the ordinary black ink can achieve a lower light transmittance for visible light than the IR ink can, and the effect of shielding is more prominent, which not only helps to reduce the cost of production, but also the effect of shielding is more in line with the process requirements.

Further, in such an embodiment, the second coating layer 15 comprises a black ink. Both light transmittances of the black ink for visible light and light transmittance of the black ink for infrared light are less than 3%.

Specifically, on the one hand, the black ink has a lower light transmittance for visible light than the IR ink has, and the effect of shielding is more obvious, which is more in line with the process requirements. On the other hand, the cost of the black ink is lower than that of the IR ink, which helps to reduce the cost of production.

Further, in such an embodiment, the electronic device 100 further comprises a cushioning layer 18 which covers the lower surface 132 and avoids the infrared sensor 161.

Specifically, the cushioning layer 18 is configured to mitigate the impact force and be shockproof to protect the transparent touch panel 12, the transparent display screen 13 and the internal structure thereof, thereby preventing the transparent display screen 13 from being damaged by effect of external impact. The cushioning layer 18 may be made of foam, foamed plastic, rubber or other soft materials. Of course, these cushioning materials are merely exemplary and the exemplary embodiments of the disclosure are not restricted herein. Further, the infrared sensor 161 is avoided in the process of setting the cushioning layer 18 in order to prevent the cushioning layer 18 from shielding the infrared sensor 161, thereby preventing the infrared sensor 161 from being affected in the process of transmitting and receiving infrared light.

Further, in such an embodiment, the electronic device 100 further comprises a sheet of metal 19 which covers the cushioning layer 18 and avoids the infrared sensor 161.

Specifically, the sheet metal 19 is configured to shield electromagnetic interference and be grounded, and has a function of diffusing risen temperature. The sheet of metal 19 may be cut from a metal material such as copper foil or aluminum foil. Of course, these metal materials are merely exemplary and the exemplary embodiments of the disclosure are not restricted herein. Further, the infrared sensor 161 is avoided in the process of setting the sheet of metal 19 in order to prevent the sheet of metal 19 from blocking the infrared sensor 161, thereby preventing the infrared sensor 161 from being affected in the process of transmitting and receiving infrared light.

An embodiment of the disclosure also provides a computer readable storage medium. One or more non-transitory computer readable storage medium containing computer executable instructions, when the computer executable instructions are executed by one or more processors, causes the processor 10 to execute any one of the above embodiments of the control method of the electronic device 100. For example, the step S10 is performed: the electronic device, when being in a state of incoming call, collects continuous multi-frame environmental images; the step S20: process the continuous multi-frame environmental images to collect a plurality of feature points in the environmental images; the step S30: determine whether the plurality of feature points in the continuous multi-frame environmental images have changed; the step S40: control the transparent display screen to be off when the plurality of feature points have changed; and the step S50: control the infrared sensor to be on to detect a distance of an object to the electronic device.

Figure 5:
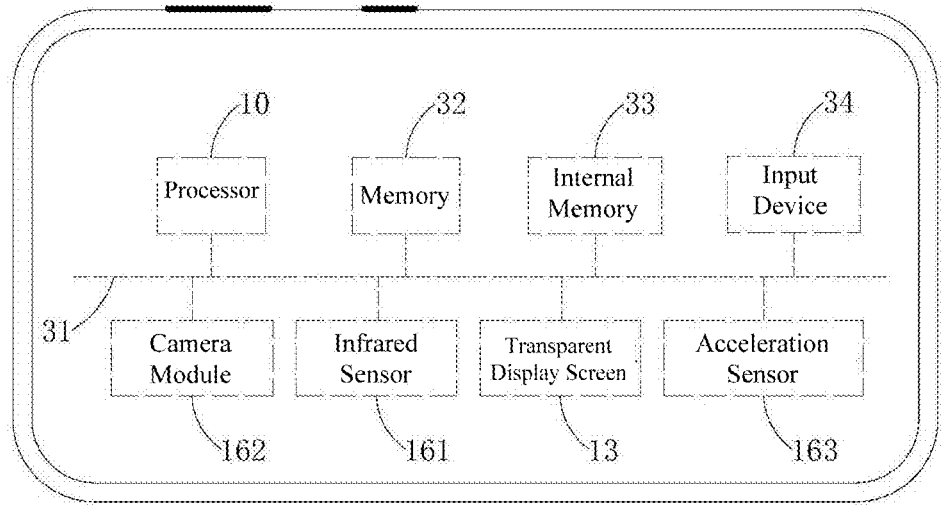
FIG. 5 is a block diagram of a computer apparatus, according to an embodiment of the disclosure.

Referring to FIG. 5, an embodiment of the disclosure also provides a computer apparatus 300. The computer apparatus 300 comprises a memory 32 and a processor 10. The memory 32 stores computer readable instructions. The processor 10 performs the control method for the electronic device 100 of any of the above embodiments when instructions are being performed by the processor 10. For example, the step S10 is performed: the electronic device, when being in a state of incoming call, collects continuous multi-frame environmental images; the step S20: process the continuous multi-frame environmental images to collect a plurality of feature points in the environmental images; the step S30: determine whether the plurality of feature points in the continuous multi-frame environmental images have changed; the step S40: control the transparent display screen to be off when the plurality of feature points have changed; and the step S50: control the infrared sensor to be on to detect a distance of an object to the electronic device.

FIG. 5 is a block diagram of internal modules of a computer apparatus 300 in an embodiment. As shown in FIG. 5, the computer apparatus 300 comprises a processor 10 connected via a system bus 31, a memory 32 (e.g. a non-transitory computer storage medium), an internal memory 33, a transparent display screen 13, an input device 34, an infrared sensor 161, a camera module 162 and an acceleration sensor 163. The memory 32 of the computer apparatus 300 stores an operating system and computer readable instructions. The computer readable instructions can be executed by the processor 10 to implement the control method of any of the above embodiments. The processor 10 may be configured to provide computing and controlling capabilities to support the operation of the entire computer apparatus 300. The internal memory 33 of the computer apparatus 300 provides an environment for computer readable instructions in the memory 32 to be operated in. The transparent display screen 13 of the computer apparatus 300 may be an OLED display screen or a Micro LED display screen. The input device 34 may be a touch screen covered on the transparent display screen 13, or may also be a button, trackball or touch pad of the computer apparatus 300, or may also be an external keyboard, touch pad, mouse and so on. The computer apparatus 300 may be a mobile phone, a tablet computer, a notebook computer, or the like. It can be understood by those skilled in the art that the structure shown in FIG. 5 is merely a schematic diagram of partial structure related to the solution of the disclosure, and does not constitute a limitation of the computer device 300 to which the solution of the disclosure is applied. A specific computer device 300 may include more or fewer components than those shown in FIG. 5, or combine some components, or have different arrangements of components.

The above disclosure provides many various embodiments or examples for implementing different structures of the disclosure. In order to simplify the disclosure of the disclosure, the components and settings of the specific examples are described above. Of course, they are merely examples and are not intended to limit the disclosure. In addition, the disclosure may repeat the reference numerals and/or reference letters in the various examples, which is for the purpose of simplicity and clarity, which does not indicate the relationship between the various embodiments and/or settings discussed herein. Moreover, the disclosure provides examples of various specific processes and materials, but those of ordinary skill in the art may realize the use of other processes and/or the use of other materials.

In the description of the present specification, the reference terms of "one embodiment", "some embodiments", "illustrative embodiment", "example", "specific example", "some examples", or the like refer to particular features, structures, materials or characteristics, which are described with reference to embodiments or examples and are included in at least one embodiment or example of the disclosure. In the present specification, the schematic description of the above terms does not necessarily refer to the same embodiment or example. Furthermore, the particular features, structures, materials, or characteristics described may be combined in suitable manners in any one or multiple embodiments or examples.

While the embodiments of the disclosure have been shown and described, those of ordinary skill in the art can understand: various modifications, changes, substitutions and variations of these embodiments may be made without departing from the theory and purpose of the disclosure. The scope of the disclosure is defined by the claims and their equivalents.

What is claimed is:

1. A control method for an electronic device, the electronic device comprises a transparent display screen comprising a display area and an infrared sensor which is disposed below the display area;
    wherein the control method comprises:
    acquiring continuous multi-frame environmental images when the electronic device is in a state of incoming call;
    processing the continuous multi-frame environmental images to collect a plurality of feature points in the environmental images;
    determining whether the plurality of feature points in the continuous multi-frame environmental images have changed;
    controlling the transparent display screen to be off when the plurality of feature points have changed; and
    controlling the infrared sensor to be on to detect a distance of an object to the electronic device.

2. The control method of claim 1, wherein the step of determining whether the plurality of feature points in the continuous multi-frame environmental images have changed comprises:
    determining whether positions of the plurality of feature points in a current frame environmental image have changed compared with the plurality of feature points in a previous frame environmental image.

3. The control method of claim 1, wherein the step of controlling the transparent display screen to be off comprises:
    determining whether the electronic device is close to a user; and
    controlling the transparent display screen to be off when the electronic device is close to the user.

4. The control method of claim 3, wherein the step of determining whether the electronic device is close to the user comprises:
    acquiring a state of motion of the electronic device;
    determining whether the state of motion meets a predetermined state of motion; and
    confirming the electronic device is close to the user, when the state of motion meets the predetermined state of motion.

5. The control method of claim 3, wherein the step of determining whether the electronic device is close to the user comprises:
  determining whether the continuous multi-frame environmental images include a human face; and
  confirming the electronic device is close to the user, when the continuous multi-frame environmental images include the human face.

6. A control device for an electronic device, wherein the electronic device comprises a transparent display screen comprising a display area and an infrared sensor which is disposed below the display area;
  wherein the control device comprises a processor configured to perform a control method for the electronic device, the method comprising:
  acquiring continuous multi-frame environmental images when the electronic device is in a state of incoming call;
  processing the continuous multi-frame environmental images to collect a plurality of feature points in the environmental images;
  determining whether the plurality of feature points in the continuous multi-frame environmental images have changed; and
  controlling the transparent display screen to be off when the plurality of feature points have changed;
  controlling the infrared sensor to be on to detect a distance of an object to the electronic device.

7. An electronic device, comprising:
  a transparent display screen comprising a display area;
  an infrared sensor disposed below the display area, and configured to emit infrared light and receive infrared light reflected by an object to detect a distance of the object to the electronic device;
  a camera module for capturing images; and
  a processor configured to acquire continuous multi-frame environmental images captured by the camera module, when the electronic device is in a state of incoming call;
  process the continuous multi-frame environmental images to collect a plurality of feature points in the environmental images;
  determine whether the plurality of feature points in the continuous multi-frame environmental images have changed;
  control the transparent display screen to be off when the plurality of feature points have changed; and
  control the infrared sensor to be on to detect a distance of an object to the electronic device.

8. The electronic device of claim 7, wherein the processor is configured to compare the plurality of feature points in the current frame environmental image with the plurality of feature points in the previous frame environmental image to determine whether positions of the plurality of feature points in the current frame environmental image have changed.

9. The electronic device of claim 7, wherein the processor is configured to determine whether the electronic device is close to a user, and control the transparent display screen to be off when the electronic device is close to the user.

10. The electronic device of claim 9, wherein the electronic device comprises an acceleration sensor for detecting a state of motion of the electronic device, wherein the processor is configured to acquire the state of motion of the electronic device which is detected by the acceleration sensor, determine whether the state of motion meets a predetermined state of motion, and determine that the user is close to the transparent display screen when the state of motion meets the predetermined state of motion.

11. The electronic device of claim 9, wherein the processor is configured to determine whether the continuous multi-frame environmental images includes a human face, and determine that the electronic device is close to the user when the human face is included in the continuous multi-frame environmental images.

12. The electronic device of claim 7, wherein the transparent display screen comprises an upper surface and a lower surface which is opposite to the upper surface, wherein a first coating layer is coated on the lower surface and covers the infrared sensor, wherein the first coating layer is configured to transmit infrared light and intercept visible light, wherein the infrared sensor is configured to transmit and/or receive infrared light transmitting though the first coating layer and the transparent display screen.

13. The electronic device of claim 12, wherein an orthographic projection of the infrared sensor on the lower surface is within an orthographic projection of the first coating layer on the lower surface.

14. The electronic device of claim 12, wherein the first coating layer comprises an IR ink, wherein light transmittance of the IR ink for infrared light is more than 85%, wherein light transmittance of the IR ink for visible light is less than 6%, wherein the IR ink allows infrared light which has a wavelength of more than 850 nm to transmit.

15. The electronic device of claim 12, wherein the electronic device comprises a second coating layer which is coated on the lower surface and connected with the first coating layer.

16. The electronic device of claim 15, wherein the second coating layer comprises a black ink, wherein light transmittances of the black ink for both visible light and infrared light are less than 3%.

17. The electronic device of claim 12, wherein the electronic device comprises a cushioning layer which covers the lower surface and avoids the infrared sensor.

18. The electronic device of claim 17, wherein the electronic device comprises a sheet of metal which covers the cushioning layer and avoids the infrared sensor.

19. The electronic device of claim 12, wherein an orthographic projection of the infrared sensor on the lower surface coincides with the first coating layer.

20. The electronic device of claim 19, wherein the electronic device comprises a light shading layer disposed on the lower surface and surrounds the infrared sensor.

* * * * *